US010571281B2

(12) United States Patent
Kondo

(10) Patent No.: US 10,571,281 B2
(45) Date of Patent: Feb. 25, 2020

(54) INFORMATION PROCESSING APPARATUS AND METHOD

(71) Applicant: FUJITSU LIMITED, Kawasaki-shi, Kanagawa (JP)

(72) Inventor: Kentaro Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 233 days.

(21) Appl. No.: 15/624,035

(22) Filed: Jun. 15, 2017

(65) Prior Publication Data
US 2017/0292842 A1  Oct. 12, 2017

Related U.S. Application Data

(63) Continuation of application No. PCT/JP2016/050890, filed on Jan. 13, 2016.

(30) Foreign Application Priority Data

Jan. 15, 2015 (JP) ................................ 2015-006226

(51) Int. Cl.
*G01C 21/00* (2006.01)
*G01C 21/26* (2006.01)
(Continued)

(52) U.S. Cl.
CPC .......... *G01C 21/26* (2013.01); *B60R 21/0132* (2013.01); *G08G 1/0112* (2013.01); *G08G 1/0133* (2013.01); *G08G 1/0141* (2013.01); *G08G 1/0968* (2013.01); *G08G 1/096758* (2013.01); *G08G 1/096775* (2013.01);
(Continued)

(58) Field of Classification Search
None
See application file for complete search history.

(56) References Cited

U.S. PATENT DOCUMENTS 6,292,719 B1 * 9/2001 Seto .................. B60K 31/0058
701/1
7,516,041 B2 * 4/2009 Smartt .................. G01C 21/32
702/167
(Continued)

FOREIGN PATENT DOCUMENTS

JP    2001-82966    3/2001
JP    2008-3657     1/2008
(Continued)

OTHER PUBLICATIONS

International Search Report dated Mar. 22, 2016 in corresponding International Application No. PCT/JP2016/050890.

*Primary Examiner* — Jonathan M Dager
(74) *Attorney, Agent, or Firm* — Staas & Halsey LLP

(57) ABSTRACT

A method executed by a computer includes outputting, by a processor, information representing a position of a spot that is ahead, in a traveling direction of a vehicle, of an occurrence spot on the basis of a position of the occurrence spot and the traveling direction of the vehicle at an occurrence time of an incident of a sudden stepping on a brake, the occurrence spot being of the incident of the sudden stepping on the brake and the position of the occurrence spot and the traveling direction of the vehicle having been determined on the basis of acceleration and a position measured by a sensor provided to the vehicle.

6 Claims, 15 Drawing Sheets

(51) Int. Cl.
*G09B 29/10* (2006.01)
*G08G 1/0967* (2006.01)
*G08G 1/01* (2006.01)
*G08G 1/16* (2006.01)
*B60R 21/0132* (2006.01)
*G08G 1/0968* (2006.01)

(52) U.S. Cl.
CPC ............... *G08G 1/16* (2013.01); *G09B 29/10* (2013.01); *G09B 29/106* (2013.01); *G08G 1/096716* (2013.01); *G08G 1/096741* (2013.01)

(56) References Cited

U.S. PATENT DOCUMENTS

| | | | | |
|---|---|---|---|---|
| 9,656,606 | B1* | 5/2017 | Vose | B60Q 9/008 |
| 9,733,093 | B2* | 8/2017 | Denaro | G01C 21/32 |
| 9,752,884 | B2* | 9/2017 | Denaro | G01C 21/26 |
| 9,797,735 | B2* | 10/2017 | Denaro | G01C 21/26 |
| 2002/0194016 | A1* | 12/2002 | Moribe | G01C 21/3697 701/469 |
| 2004/0215373 | A1* | 10/2004 | Won | G08G 1/161 701/1 |
| 2005/0278118 | A1* | 12/2005 | Kim | G01C 21/26 701/469 |
| 2007/0296574 | A1* | 12/2007 | Smith | G08B 21/10 340/539.13 |
| 2008/0243380 | A1* | 10/2008 | Han | G01C 21/3638 701/431 |
| 2009/0299630 | A1* | 12/2009 | Denaro | B60W 30/18009 701/300 |
| 2009/0300035 | A1* | 12/2009 | Denaro | G01C 21/32 |
| 2009/0300053 | A1* | 12/2009 | Denaro | B60W 10/06 |
| 2010/0241353 | A1* | 9/2010 | Park | G01C 21/30 701/532 |
| 2010/0332266 | A1* | 12/2010 | Tamir | G06Q 30/0283 705/4 |
| 2011/0304447 | A1* | 12/2011 | Marumoto | G07C 5/085 340/438 |
| 2012/0166229 | A1* | 6/2012 | Collins | G06Q 40/08 705/4 |
| 2013/0317665 | A1* | 11/2013 | Fernandes | G08G 5/0039 701/1 |
| 2015/0179066 | A1* | 6/2015 | Rider | G08G 1/04 701/31.5 |
| 2015/0324923 | A1* | 11/2015 | Christensen | G06Q 40/08 705/4 |
| 2016/0027305 | A1* | 1/2016 | Inaba | G01C 21/3697 340/905 |
| 2016/0061625 | A1* | 3/2016 | Wang | G01C 21/3697 701/454 |
| 2016/0223343 | A1* | 8/2016 | Averbuch | B60W 50/14 |
| 2017/0024938 | A1* | 1/2017 | Lindsay | G07C 5/02 |
| 2017/0101093 | A1* | 4/2017 | Barfield, Jr. | B60W 30/095 |
| 2018/0215344 | A1* | 8/2018 | Santora | H04N 5/2258 |

FOREIGN PATENT DOCUMENTS

| | | |
|---|---|---|
| JP | 2011-28415 | 2/2011 |
| JP | 2013-69247 | 4/2013 |

* cited by examiner

| TIME | FORWARD-BACKWARD ACCELERATION | VELOCITY VECTOR | TRAVELING SPOT COORDINATES | |
|---|---|---|---|---|
| | | | LATITUDE | LONGITUDE |
| 2014.12.12 19:18:30 | **** | **** | ***.* | ***.* |
| 2014.12.12 19:18:31 | **** | **** | ***.* | ***.* |
| 2014.12.12 19:18:32 | **** | **** | ***.* | ***.* |
| 2014.12.12 19:18:33 | **** | **** | ***.* | ***.* |
| 2014.12.12 19:18:34 | ... | ... | ... | ... |
| ... | | | | |

| NODE IDENTIFIER | POSITION INFORMATION | |
|---|---|---|
| | LATITUDE | LONGITUDE |
| N0001 | ***.* | ***.* |
| N0002 | ***.* | ***.* |
| N0003 | ***.* | ***.* |
| ... | ... | ... |

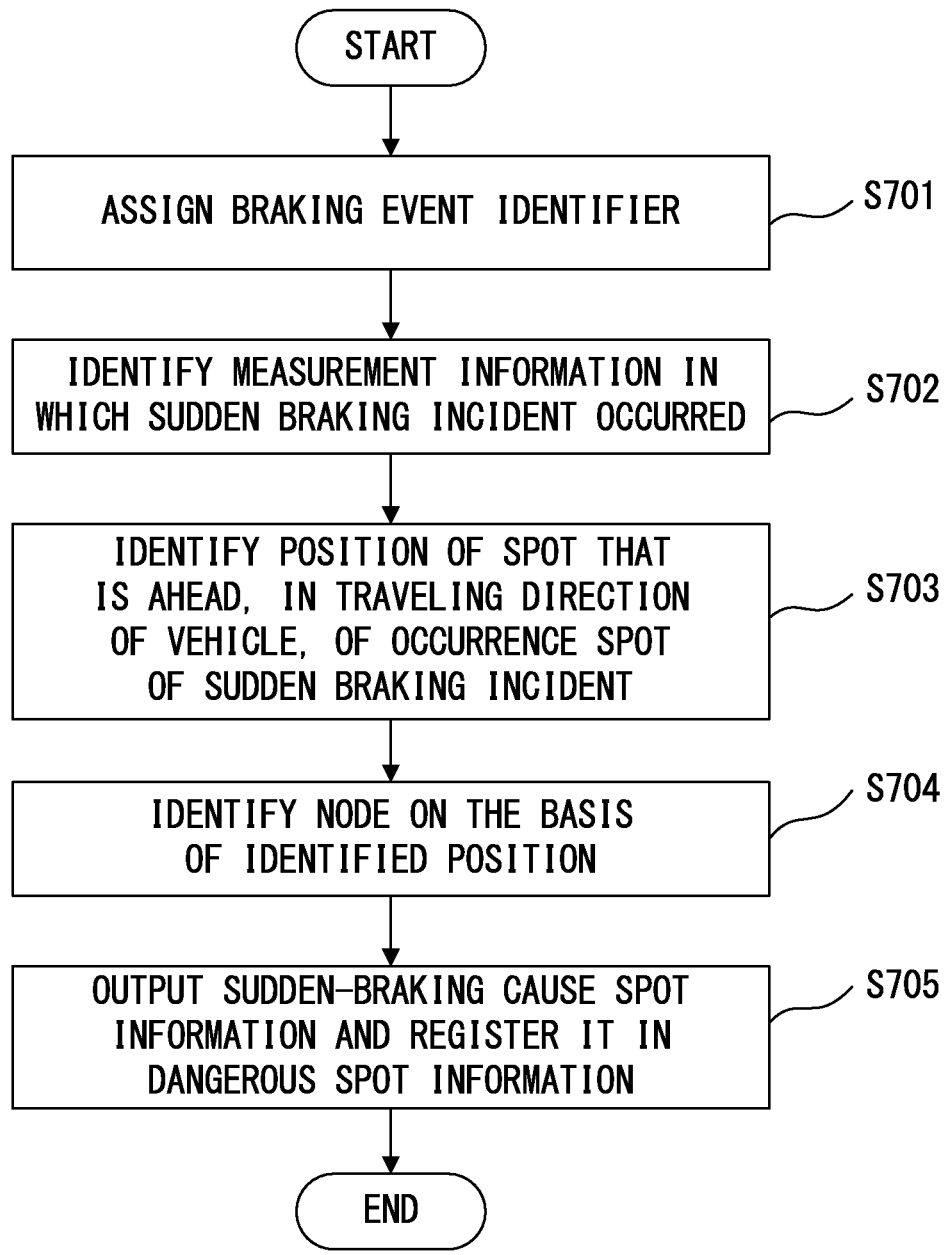
F I G. 7

| TIME | BRAKING EVENT IDENTIFIER : B0001 | | TRAVELING SPOT COORDINATES | |
| --- | --- | --- | --- | --- |
| | FORWARD-BACKWARD ACCELERATION | VELOCITY VECTOR | LATITUDE | LONGITUDE |
| 2014.12.12 19:18:30 | **** | **** | ***.* | ***.* |
| 2014.12.12 19:18:31 | **** | **** | ***.* | ***.* |
| 2014.12.12 19:18:32 | **** | **** | ***.* | ***.* |
| 2014.12.12 19:18:33 | **** | **** | ***.* | ***.* |
| 2014.12.12 19:18:34 | **** | **** | ***.* | ***.* |
| ... | ... | ... | ... | ... |

FIG. 8

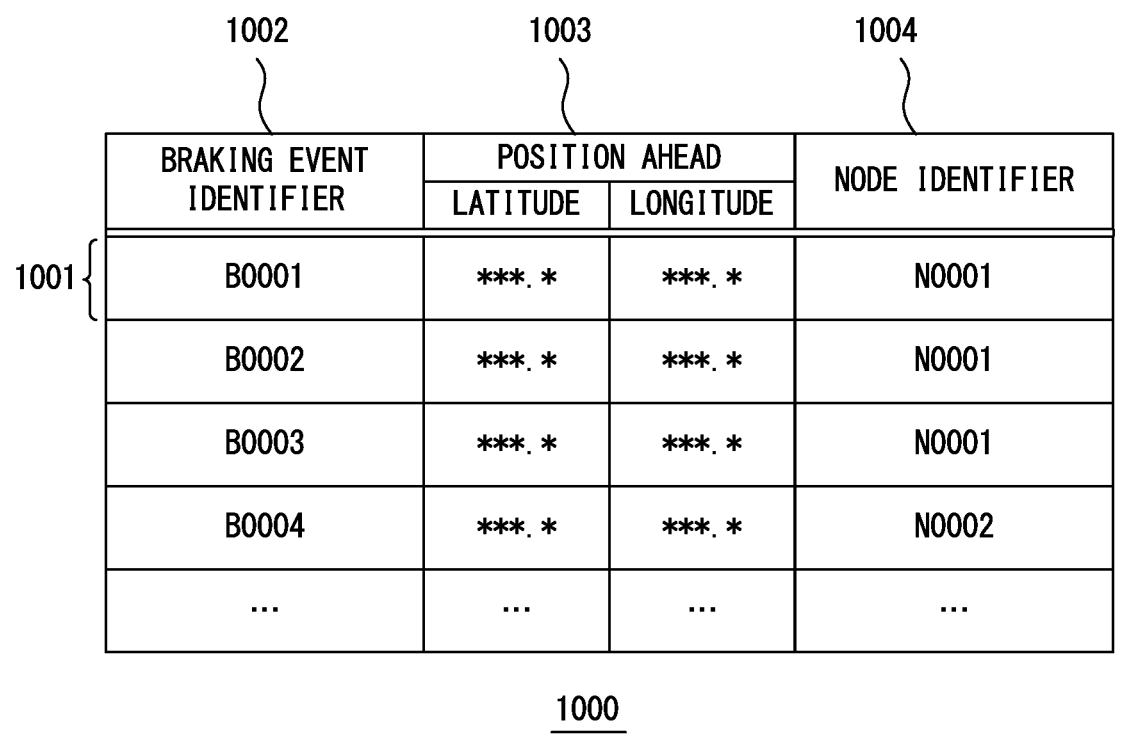

| BRAKING EVENT IDENTIFIER | POSITION AHEAD | | NODE IDENTIFIER |
| --- | --- | --- | --- |
| | LATITUDE | LONGITUDE | |
| B0001 | ***.* | ***.* | N0001 |
| B0002 | ***.* | ***.* | N0001 |
| B0003 | ***.* | ***.* | N0001 |
| B0004 | ***.* | ***.* | N0002 |
| ... | ... | ... | ... |

FIG. 10

| LINK IDENTIFIER | LINK INFORMATION |
|---|---|
| L0001 | N0001, N0002 |
| L0002 | N0002, N0005 |
| L0003 | N0003, N0005 |
| ... | ... |

| BRAKING EVENT IDENTIFIER | POSITION AHEAD | | NODE IDENTIFIER | LINK IDENTIFIER | NUMBER OF INCIDENTS | REPRESENTATIVE VALUE OF DISTANCES |
| --- | --- | --- | --- | --- | --- | --- |
| | LATITUDE | LONGITUDE | | | | |
| B0001 | ***.* | ***.* | N0001 | L0001 | *** | ***.* |
| B0002 | ***.* | ***.* | N0001 | L0001 | *** | ***.* |
| B0003 | ***.* | ***.* | N0001 | L0002 | *** | ***.* |
| B0004 | ***.* | ***.* | N0002 | L0009 | *** | ***.* |
| ... | ... | ... | ... | ... | ... | ... |

1300

INFORMATION PROCESSING APPARATUS AND METHOD

CROSS-REFERENCE TO RELATED APPLICATION

This application is a continuation application of International Application PCT/JP2016/050890 filed on Jan. 13, 2016 and designated the U.S., the entire contents of which are incorporated herein by reference. The International Application PCT/JP2016/050890 is based upon and claims the benefit of priority of the prior Japanese Patent Application No. 2015-006226, filed on Jan. 15, 2015, the entire contents of which are incorporated herein by reference.

FIELD

The embodiments discussed herein are related to an information processing apparatus and a method.

BACKGROUND

In recent years, it has become possible to collect pieces of data related to the traveling history of a vehicle from an on-board device, such as a drive recorder, a digital tachometer, etc., that is mounted on the vehicle, so as to obtain useful knowledge from a set of the collected pieces of data.

For example, there are cases in which an incident is detected in which the brake of a vehicle is suddenly stepped on (this incident will also be referred to as a sudden braking incident hereinafter in some cases) on the basis of the acceleration of the vehicle that is measured by an on-board device and information of a spot at which a sudden braking incident occurred is used to alarm the driver or for other purposes.

As an art related to this, a technique that provides a control system etc. that can raise an alarm adequately at a place where it is needed and can suppress alarms in a case where they are not needed is known (see Patent Document 1 for example). Also, a technique is known that avoids plotting the same incident in the same place in a technique for plotting a place, obtained by a drive recorder, where an incident occurred (see Patent Document 2 for example).

Patent Document 1: Japanese Laid-open Patent Publication No. 2013-69247

Patent Document 2: Japanese Laid-open Patent Publication No. 2008-3657

SUMMARY

According to an aspect of the embodiments, a method executed by a computer includes outputting, by a processor, information representing a position of a spot that is ahead, in a traveling direction of a vehicle, of an occurrence spot on the basis of a position of the occurrence spot and the traveling direction of the vehicle at an occurrence time of an incident of a sudden stepping on a brake, the occurrence spot being of the incident of the sudden stepping on the brake and the position of the occurrence spot and the traveling direction of the vehicle having been determined on the basis of acceleration and a position measured by a sensor provided to the vehicle.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 exemplifies braking event report information according to a first embodiment;

FIG. 6 exemplifies numerical map node information according to the first embodiment;

FIG. 7 exemplifies a cause spot estimation process of sudden braking according to the first embodiment;

FIG. 8 exemplifies braking event information according to the first embodiment;

FIG. 10 exemplifies dangerous spot information according to the first embodiment;

FIG. 11 exemplifies numerical map link information according to a second embodiment;

FIG. 13 exemplifies dangerous spot analysis information according to the second embodiment;

DESCRIPTION OF EMBODIMENTS

Figure 1:
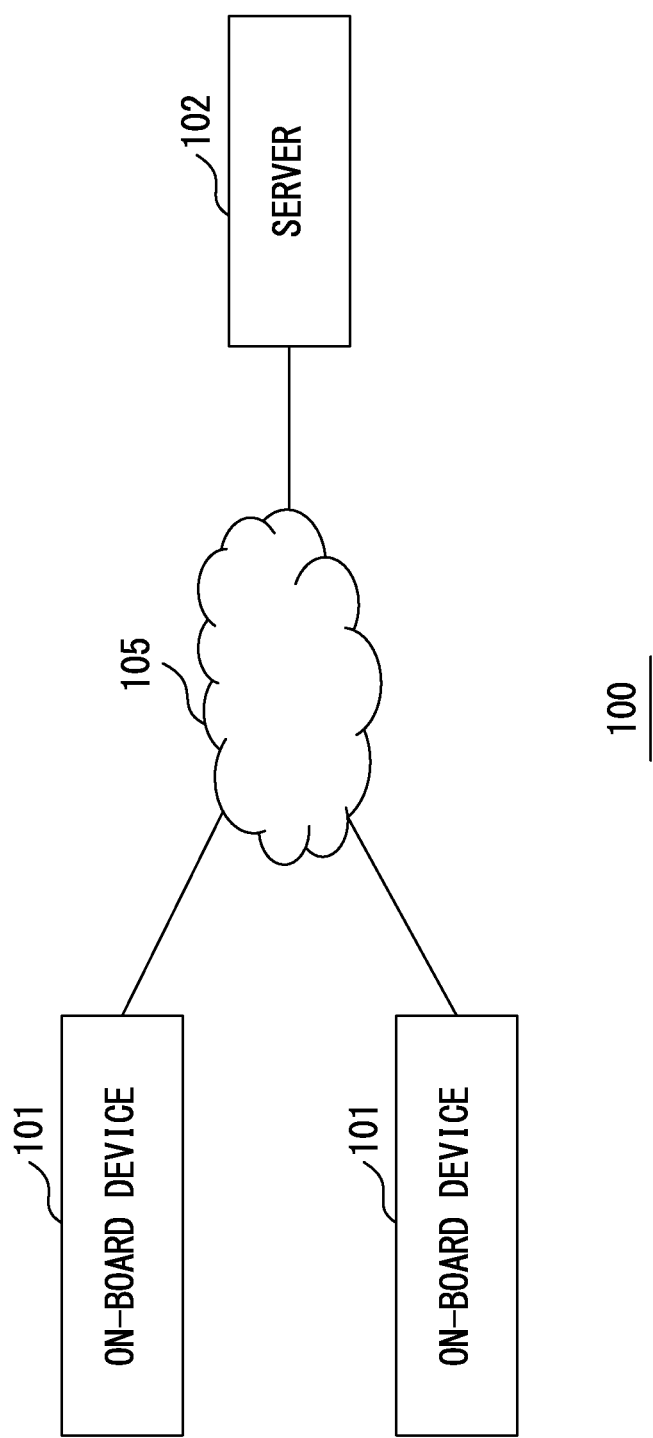
FIG. 1 exemplifies a configuration of a system according to an embodiment.

When for example a driver suddenly steps on the brake, the spot at which the brake was suddenly stepped on often exists before a spot at which the cause that made the driver suddenly step on the brake exists. Because of this, there is a difference between a spot at which a sudden braking incident occurs and a spot at which the cause of the occurrence of the sudden braking incident exists, and these two spots are sometimes apart by several tens of meters or more. Thus, it is desirable that a technique capable of providing information of a spot that is estimated to have the cause of the occurrence of a sudden braking incident be provided.

Hereinafter, detailed explanations will be given for several embodiments of the present embodiments while referring to the drawings. Note that similar symbols denote corresponding elements across a plurality of drawings.

FIG. 1 exemplifies a configuration of a system 100 according to an embodiment. The system 100 includes for example an on-board device 101 and a server 102. The on-board device 101 may be for example a device, such as a drive recorder, a digital tachometer, an event data recorder, etc. mounted on a vehicle, that is provided with a sensor capable of measuring the motion including the acceleration and the position of the traveling vehicle. Note that, in one embodiment, the on-board device 101 may be a mobile terminal, such as a smart phone, a tablet terminal, a mobile phone, etc., that is held by the driver of the vehicle. Alternatively, in a different embodiment, for example the on-board device 101 may be implemented by making a device mounted on a vehicle and a mobile terminal cooperate with each other. The server 102 may be for example an information processing apparatus provided with a function of processing information. Also, the on-board device 101 may be connected to the server 102 via a communication network 105 such as a WAN (Wide Area Network).

Figure 2:
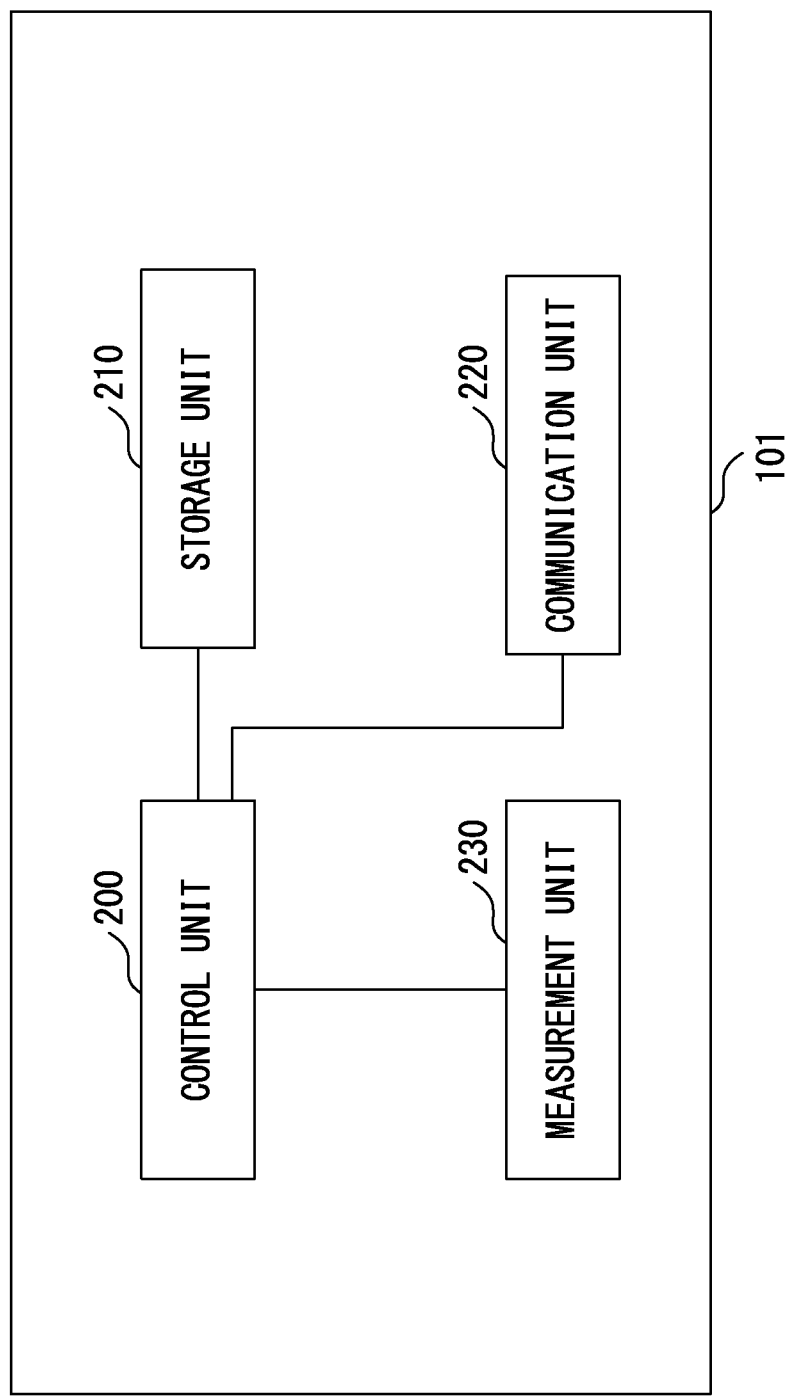
FIG. 2 exemplifies a function block configuration of an on-board device according to an embodiment.

FIG. 2 exemplifies a function block configuration of the on-board device 101 according to an embodiment. The on-board device 101 includes for example a control unit 200, a storage unit 210, a communication unit 220, and a measurement unit 230. The control unit 200 may be connected to for example the storage unit 210, the communication unit 220 and the measurement unit 230, and may control respective units of the on-board device 101 including the storage unit 210, the communication unit 220 and the measurement unit 230. The storage unit 210 may store for example a program and information measured in the measurement unit 230. The measurement unit 230 may measure for example the motion and the position of a vehicle on which the on-board device 101 is mounted. For example, the measurement unit 230 may include a GPS (Global Positioning System) receiver, and may measure the position of the vehicle by using the GPS receiver. Also, in one embodiment, the measurement unit 230 may measure the velocity vector of the vehicle by using the GPS receiver. The measurement unit 230 may include for example an acceleration sensor, and may measure the acceleration of the vehicle by using the acceleration sensor. The measurement unit 230 may include for example a speedometer, and may measure the speed of the vehicle by using the speedometer. The communication unit 220 may report information of the motion and the position of the vehicle such as for example the position, the velocity vector, the acceleration, the speed, etc. of the vehicle to the server 102 via the communication network 105 in accordance with an instruction from the control unit 200, the information being measured by the measurement unit 230.

Figure 3:
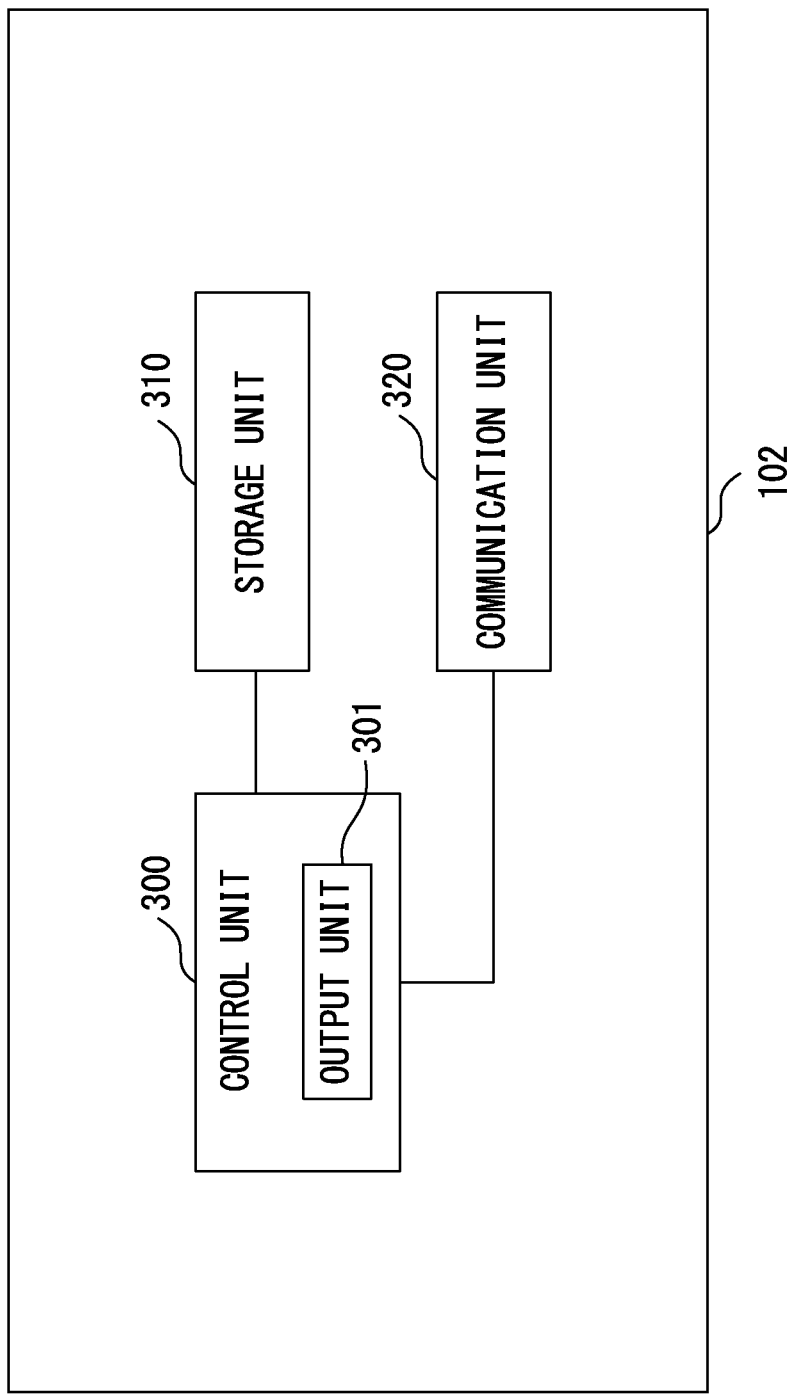
FIG. 3 exemplifies a function block configuration of a server according to an embodiment.

FIG. 3 exemplifies a function block configuration of the server 102 according to the embodiment. The server 102 includes for example a control unit 300, a storage unit 310 and a communication unit 320. The control unit 300 may be connected to for example the storage unit 310 and the communication unit 320, and may control respective units of the server 102 including the storage unit 310 and the communication unit 320. In one embodiment, the control unit 300 of the server 102 reads and executes a program so as to operate as a function unit such as for example an output unit 301. Also, the storage unit 310 may store for example a program and information such as numerical map node information 600, braking event information 800, dangerous spot information 1000, numerical map link information 1100, dangerous spot analysis information 1300, etc., which will be described later. The communication unit 320 may for example receive information of the motion and the position of the vehicle from the on-board device 101 in accordance with an instruction from the control unit 300. These function units and information stored in the storage unit 310 will be described later in further detail.

Figure 4A:
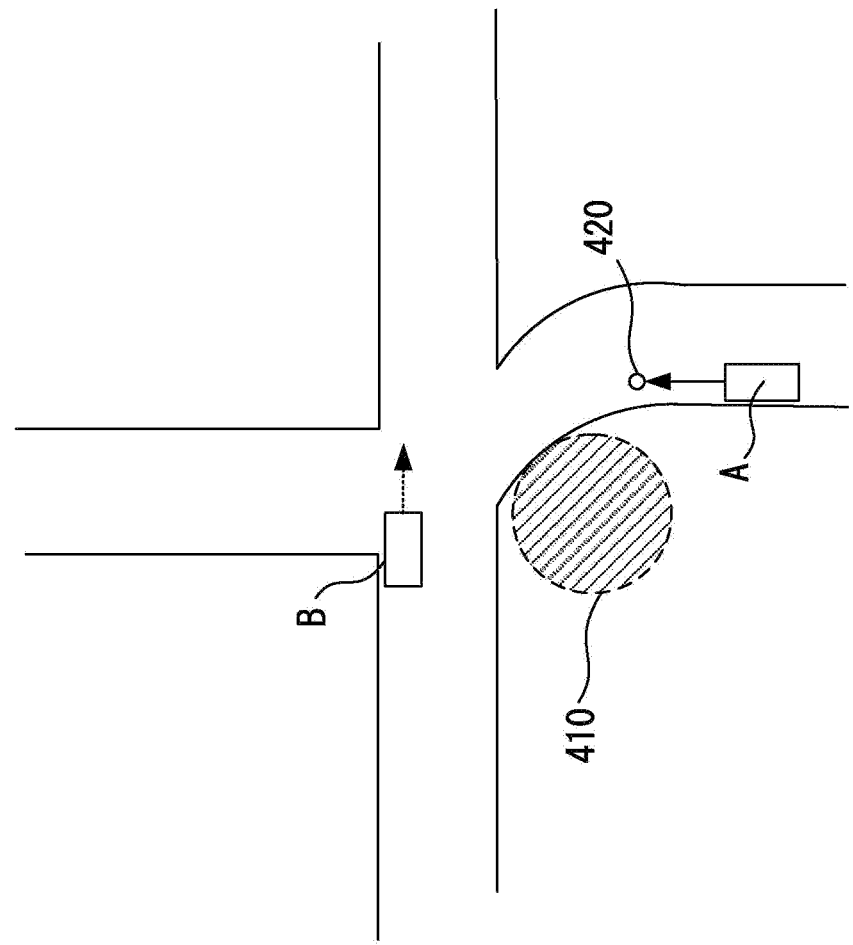
FIG. 4A and FIG. 4B exemplify situations where the driver of a vehicle suddenly steps on the brake.
Figure 4B:
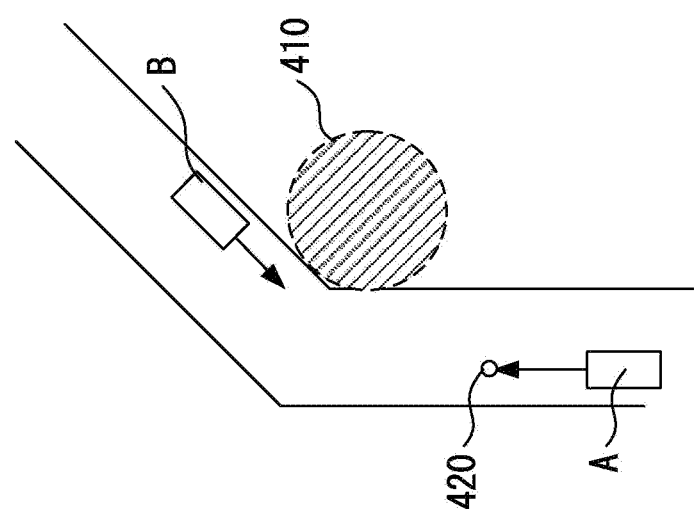

FIG. 4A and FIG. 4B exemplify situations where the driver of a vehicle suddenly steps on the brake. FIG. 4 exemplifies a situation where vehicle A enters a curve. FIG. 4A illustrates vehicle A and vehicle B, which is a vehicle that is an oncoming vehicle for vehicle A, and it is assumed that the two vehicles are traveling in the directions represented by the arrows, respectively. It is also assumed for example that the curve has the visibility hindered by an obstruction 410 such as street plants. In such a case, for example the obstruction 410 sometimes prevents the driver of vehicle A from visually perceiving the approach of an oncoming vehicle, causing the vehicle to enter the curve at a high speed and the driver to notice the oncoming vehicle at a spot 420 and suddenly step on the brake. In such a case, the cause that made the driver of vehicle A suddenly step on the brake is for example a curve with poor visibility, and is located at a position that is ahead, in the traveling direction of vehicle A, of the spot 420 at which the driver suddenly stepped on the brake in vehicle A.

Also, FIG. 4B exemplifies a situation where vehicles A and B are entering an intersection. It is assumed that vehicle A is traveling in the direction represented by the arrow. It is assumed that the intersection has the obstruction 410 such as for example a street plant etc. and that the visibility between the road on which vehicle A is traveling and the road on which vehicle B is traveling is hindered by the obstruction 410. Also, as illustrated in FIG. 4B, the road on which vehicle A is traveling crosses the other road at the intersection at a position shifted from the road positioned on the opposite side of the intersection. Because of this, when the driver of vehicle B tries to check, in a visual manner, the road on which vehicle A is traveling, this positional shift sometimes prevents the driver of vehicle B from checking the road on which vehicle A is traveling without entering deep into the intersection. Meanwhile, there may be a situation where the obstruction 410 prevents the driver of vehicle A from noticing the fact that vehicle B has entered deep into an intersection until he or she approaches the intersection so that he or she notices vehicle B at the spot 420 and suddenly steps on the brake. In such a case, the cause that made the driver of vehicle A step on the brake is that, for example, at the intersection the visibility is poor and the roads cross each other at a shifted position, and the spot causing the sudden braking is positioned ahead, in the traveling direction of vehicle A, of the spot 420 at which the driver suddenly stepped on the brake in vehicle A.

As exemplified above, when for example the driver suddenly steps on the brake in a vehicle, the spot at which the cause makes the driver suddenly step on the brake exists is often at a position that is ahead, in the traveling direction of the vehicle, of the spot at which the driver suddenly stepped on the brake in the vehicle. Thus, in some embodiments, the control unit 200 of the on-board device 101 measures for example the motion and the position of a vehicle by the measurement unit 230. When it is detected on the basis of the measured information that the brake was stepped on, the control unit 200 reports, to the server 120, information including the position and the motion of the vehicle at the occurrence time of the sudden braking incident. Then, on the basis of information including the position and the motion of the vehicle at the occurrence time of the sudden braking incident reported from the on-board device 101, the control unit 300 of the server 102 outputs information about the position of a spot that is ahead, in the traveling direction of the vehicle, of the occurrence spot of the sudden braking incident. This makes it possible for the control unit 300 of the server 102 to output for example information about a spot that is estimated to have the cause of the occurrence of the sudden braking incident. Also, for example manufacturing companies of car navigation systems etc. can use output information about a spot estimated to have the cause of the occurrence of the sudden braking incident to warn drivers of vehicles. Also, operators of road projects etc. for example can know spots that have a high possibility of having a factor that reduces the safety from output information about a spot estimated to have the cause of the occurrence of a sudden braking incident, and can use this information to help them take measures to remove such factors.

Also, as another method of warning drivers in a situation as illustrated in FIG. 4A and FIG. 4B for example, using the position of the spot 420 at which the brake was suddenly stepped on in vehicle A to warn the driver of a vehicle that is entering the spot 420 can be considered. However, the curve illustrated in FIG. 4A for example is in a situation where the visibility is also poor for the driver of vehicle B traveling in the opposite lane because of the obstruction 410, making it difficult for him or her to visually perceive vehicle A. Thus, this curve having the poor visibility can also be a cause that makes the driver of a vehicle entering the curve from the side of vehicle B suddenly step on the brake. Meanwhile, the spot 420, at which the driver of vehicle A suddenly stepped on the brake, is shifted from the spot of the curve having the poor visibility, which caused the sudden stepping on the brake, and is located at a spot that is farther from vehicle B that is entering the curve from the oncoming vehicle lane than the curve. In some cases, these two spots are apart by several tens of meters or more. Thus, there is a possibility that the spot 420 at which the brake was suddenly stepped on in vehicle A will not be able to be used as a spot at which the driver of vehicle B is warned. Meanwhile, in some embodiments, the control unit 300 of the server 102 outputs information about the position of a spot that is ahead, in the traveling direction of vehicle, of the occurrence spot of the sudden braking incident, on the basis of information including the position and the motion of the vehicle at the occurrence time of the sudden braking incident. In this example, the position of a spot that is ahead, in the traveling direction of the vehicle, of the occurrence spot of the sudden braking incident is estimated to indicate the position of the curve that caused the sudden braking more accurately than the spot 420 at which the sudden braking incident occurred. Thus, it is made possible to also warn the driver of vehicle B that is entering the curve from the oncoming vehicle lane by using for example information about the position of a spot that is ahead, in the traveling direction of the vehicle, of the occurrence spot of the sudden braking incident.

Also, similarly, the intersection illustrated in FIG. 4B for example is in a situation where the visibility is also poor for the driver of vehicle B because of the obstruction 410, making it difficult for him or her to visually perceive vehicle A. Further, in this intersection, the road on which vehicle A is traveling crosses the other road at a position shifted from the road positioned on the opposite side of the intersection. When the road on which vehicle A is traveling is a priority road and the road on which vehicle B is traveling is a non-priority road, the driver of vehicle B is to stop the vehicle temporarily so as to check whether or not there is a vehicle on the priority road. Vehicle B is in a situation where the driver of vehicle B checks the direction to the right of vehicle B and thus the vehicle B is likely to enter deep into the intersection. Thus, this intersection having poor visibility can be a cause of danger also for vehicles that are entering the intersection from the side of vehicle B. Note in the figure that in order to illustrate the traveling direction of vehicle B after the temporary stop, the arrow for representing the traveling direction is drawn by a dotted line. Meanwhile, the spot 402, at which the brake was suddenly stepped on in vehicle A, is shifted from a spot of the intersection having a poor visibility that caused the sudden stepping on the brake, and is at a spot farther from vehicle B than the intersection. Thus, there is a possibility that the spot 420, at which the brake was suddenly stepped on in vehicle A, will not be able to be used as a spot at which the driver of vehicle B is warned. Meanwhile, in some embodiments, the control unit 300 of the server 102 outputs information about the position of a spot that is ahead, in the traveling direction of vehicle, of the occurrence spot of the sudden braking incident, on the basis of information including the position and the motion of the vehicle at the occurrence time of the sudden braking incident. Thus, it is made possible to also warn the driver of vehicle B by using for example information about the position of a spot that is ahead, in the traveling direction of the vehicle, of the occurrence spot of the sudden braking incident.

Also, further, in a case where for example a sudden braking incident occurred in a vehicle etc., when an image recorded by a drive recorder etc. is checked by a human in a visual manner and the cause of the occurrence of the sudden braking incident is estimated, the cause is often found in a curve, an intersection, etc. Meanwhile, numerical maps in which for example information about the positions of roads and intersections across the nation and various types of spot information are registered are widely used for car navigation systems etc. A numerical map may be a numerical map created by an institution such as the Geographical Survey Institute etc. These numerical maps indicate roads by using nodes and links. In this example, a node may be a point that is arranged at a curve and intersection of roads or a nodal point etc. used for representing road networks. Also, a link may be for example a line segment indicating a road that connects nodes. Thus, in some embodiments, the control unit 300 of the server 102 determines the position of a spot that is ahead, in the traveling direction of a vehicle, of the occurrence spot of a sudden braking incident, and determines a node that is within a prescribed distance from the position thereof from among nodes included in a numerical map. Then, the control unit 300 outputs information representing the determined node as information about the position of a spot that is ahead, in the traveling direction of the vehicle, of the occurrence spot of the sudden braking incident. Thus, it is possible to provide for example manufacturing companies of car navigation systems, operators of road projects, etc. with information about a node having a high possibility that the cause that made the driver suddenly step on the brake will be found in it. Also, by determining a node, it is made possible to easily register, in a numerical map, information about a dangerous spot that is estimated to be the cause of the occurrence of a sudden braking incident for example, and thereby it is possible to provide users with information about dangerous spots in a form that is easy to use.

As described above, information output by some embodiments about the position of a spot that is ahead, in the traveling direction of a vehicle, of the occurrence spot of a sudden braking incident can be used for avoiding accidents and is useful. Hereinafter, the first embodiment will be explained.

<First Embodiment>

In the first embodiment, an embodiment is exemplified in which the measurement unit 230 of the on-board device 101 includes a GPS receiver that can measure the velocity vector and the position of a vehicle and an acceleration sensor that measures the forward-backward acceleration of a vehicle. Note that forward-backward acceleration may be for example acceleration that is caused along the longitudinal axis in which the traveling direction in a case when a vehicle traveling forward straightly is the forward direction. The control unit 200 of the on-board device 101 for example obtains values measured by the GPS receiver and the acceleration sensor for each prescribed time (0.5 seconds through 3 seconds for example), and determines on the basis of the obtained values whether or not an incident that causes a sudden stepping on the brake in the vehicle including the on-board device 101 has occurred. In one embodiment, when the magnitude of the forward-backward acceleration having a negative value measured by the acceleration sensor becomes equal to or greater than a prescribed value, the control unit 200 of the on-board device 101 may determine that a sudden braking incident occurred. Then, the control unit 200 may transmit, to the server 102, braking event report information 500 including for example a measurement value obtained through measurement by the measurement unit 230 during a prescribed period including the occurrence time point of the sudden braking incident.

FIG. 5 exemplifies the braking event report information 500 that the control unit 200 of the on-board device 101 transmits to the server 102. In the braking event report information 500, measurement information 501 for example may be registered. The measurement information 501 may include for example information of time 502, forward-backward acceleration 503, a velocity vector 504, and traveling spot coordinates 505, and these pieces of information are associated in the measurement information 501. The time 502 may be a time at which the forward-backward acceleration 503, the velocity vector 504 and the traveling spot coordinates 505 associated in the measurement information 501 were measured by the measurement unit 230. Note that the measurement information 501 is registered in the braking event report information 500 in time series in the example of FIG. 5. The forward-backward acceleration 503 may be for example acceleration that is caused along the longitudinal axis in which the traveling direction in a case when a vehicle traveling forward straightly is the forward direction. The forward-backward acceleration 503 may be for example a value obtained by the acceleration sensor included in the measurement unit 230. The velocity vector 504 may be for example vectors that represent the traveling direction and the traveling speed of the vehicle. In one embodiment, a value of a component of each axis of the velocity vector of a vehicle in a three-dimensional coordinate system defining an axis in a prescribed direction may be registered in the velocity vector 504. Alternatively, in a different embodiment, a value of a component of each axis of the velocity vector of a vehicle in a two-dimensional coordinate system such as a universal transverse mercator coordinate system etc. may be registered in the velocity vector 504. The traveling spot coordinates 505 may be for example the position of a vehicle measured by the measurement unit 230, and may be a longitude and a latitude that represent the position of the vehicle in one embodiment. The velocity vector 504 and the traveling spot coordinates 505 may be for example a value obtained through measurements by the GPS receiver included in the measurement unit 230. Note that the measurement information 501 including the forward-backward acceleration 503 that is equal to or greater than a prescribed value that led to a determination that a sudden braking incident occurred may be included in the braking event report information 500.

Also, FIG. 6 exemplifies numerical map node information 600 according to the first embodiment. The numerical map node information 600 may be for example a numerical map created by an institution such as the Geographical Survey Institute etc. As described above, a numerical map indicates for example roads by using nodes and links. In this example, a node may be a point that is arranged at a curve and an intersection of roads or a nodal point etc. used for representing road networks. Also, a link may be for example a line segment indicating a road that connects nodes. Also, in the numerical map node information 600 illustrated in FIG. 6, for example a node 601, which is information representing a node on a numerical map, is registered. The node 601 may include anode identifier 602 and position information 603, and these pieces of information are associated in the node 601. The node identifier 602 is an identifier for identifying each node that is registered in the numerical map node information 600. The position information 603 is information representing the position of a node that is identified by the node identifier 602, and may be for example the longitude and latitude of the position at which a node exists.

FIG. 7 exemplifies a cause spot estimation process of sudden braking that is executed by the control unit 300 of the server 102 according to the first embodiment. In one embodiment, the control unit 300 of the server 102 may start the cause spot estimation process of sudden braking illustrated in FIG. 7 when for example the braking event report information 500 is received from the on-board device 101. Note that, in a different embodiment, the control unit 300 of the server 102 may accumulate, in the storage unit 310, pieces of the braking event report information 500 received from the on-board device 101 so as to collectively process each of the pieces of the braking event report information 500 later.

In S701, the control unit 300 of the server 102 assigns a braking event identifier to the braking event report information 500 received from the on-board device 101, and generates braking event information 800. FIG. 8 exemplifies the braking event information 800, and a braking event identifier 801 has been added to the braking event report information 500 received from the on-board device 101. The braking event identifier 801 may be for example an identifier for identifying each of the plurality of pieces of the braking event information 800 generated in S701 each time the operation flow of FIG. 7 is executed.

In S702, the control unit 300 refers to the measurement information 501 included in the braking event information 800, and determines the measurement information 501 in which a sudden braking incident occurred. For example, the control unit 300 obtains values of the forward-backward acceleration 503 included in the measurement information 501 in time series starting from the value having the oldest time 502. Then, the control unit 300 may determine the measurement information 501 in which the forward-backward acceleration 503 has a negative value and the magnitude of the forward-backward acceleration 503 became equal to or greater than a prescribed value for the first time to be the measurement information 501 in which sudden braking occurred. Also, a method of detecting the occurrence of a sudden braking incident is not limited to this, and the measurement information 501 in which a sudden braking incident occurred may be determined from the pieces of the measurement information 501 included in the braking event information 800 by using a different method. Also, in a different embodiment, in a case when for example the control unit 200 of the on-board device 101 is conducting determination of whether or not a sudden braking incident has occurred, information for determining the measurement information 501 in which a sudden braking incident has occurred may be obtained from the on-board device 101.

In S703, the control unit 300 determines the position of a spot that is ahead, in the traveling direction of a vehicle, of the occurrence spot of a sudden braking incident on the basis of the measurement information 501 in which the sudden braking incident occurred. This is because when for example the driver of a vehicle suddenly steps on the brake as described above, the cause of that sudden braking is highly likely to be positioned ahead, in the traveling direction of the vehicle, of the spot at which the brake was suddenly stepped on. On the basis of for example information about the motion and the position of a vehicle included in the measurement information 501 in which a sudden braking incident occurred, the control unit 300 determines the position of a spot that is ahead, in the traveling direction of the vehicle, of the occurrence spot of the sudden braking incident. In one embodiment, the position of this spot that is ahead in the traveling direction may be calculated by equation 1 described below.

$$Ps = P + Vvector \times \Delta t \qquad \text{Equation 1}$$

In equation 1, Ps may be coordinates that represent the calculated position of a spot that is ahead in the traveling direction. P represents the position of the occurrence spot of the sudden braking incident. P may be obtained from the traveling spot coordinates 505 of the measurement information 501 determined in step S702 for example. Also, V vector is a velocity vector of the vehicle at the occurrence time of the sudden braking incident. A V vector may be obtained from for example the velocity vector 504 of the measurement information 501 determined in S702. Also, Δt is time, and may be a prescribed time in one embodiment. Prescribed time may be for example a period of time that is in a range between 0.5 seconds and 5 seconds, and may be 2 seconds in one embodiment. Also, the control unit 300 may calculate equation 1 above by using these values so as to calculate the position of a spot that is ahead, in the traveling direction of a vehicle, of the occurrence spot of the sudden braking incident.

Note that while the velocity vector 504 is included in the braking event report information 500 illustrated in FIG. 5 and the braking event information 800 illustrated in FIG. 8, the velocity vector 504 does not have to be included in them in a different embodiment. Also, in such a case, the control unit 300 of the server 102 may obtain a velocity vector that represents the speed, and the traveling direction of a vehicle may be obtained from for example the traveling spot coordinates 505 of the measurement information 501 in which a sudden braking incident occurred and the traveling spot coordinates 505 of the measurement information 501 that is before or after the traveling spot coordinates 505 in which the sudden braking incident occurred in time series.

Also, while V vector (velocity vector) is used in equation 1 above, Ps may be calculated by using the speed and a vector representing the traveling direction of a vehicle in a different embodiment. For example, the control unit 300 of the server 102 may use a unit vector obtained by dividing a velocity vector by the magnitude thereof as a vector representing the traveling direction of a vehicle (which will also be referred to as a traveling direction vector hereinafter in some cases). Also, the control unit 300 of the server 102 may calculate Ps by adding a value to P (occurrence position of a sudden braking incident), the value being obtained by multiplying a prescribed speed and prescribed time Δt by a traveling direction vector. Alternatively, in a different embodiment, the traveling speed of a vehicle measured by the measurement unit 230 of the on-board device 101 may be used instead of a prescribed speed. In such a case, the measurement unit 230 of the on-board device 101 may include a speedometer that measures the travelling speed of the vehicle, and the control unit 200 of the on-board device 101 may include the traveling speed of the vehicle measured by the speedometer in the braking event report information 500 so as to transmit the information to server 102. Note that for example by using the traveling speed of a vehicle instead of a prescribed speed, it is possible to estimate a spot having the cause of sudden braking more accurately.

In S704, the control unit 300 of the server 102 determines a node on the basis of the position (Ps) of a spot, determined in S703, that is ahead in the traveling direction from among nodes included in the numerical map node information 600. The control unit 300 may determine for example the node 601 having the position information 603 within a prescribed distance from Ps from among nodes 601 included in the numerical map node information 600. A prescribed distance may be a distance in a range between for example 10 m through 50 m, and may be 20 m in one example. Note that when a plurality of nodes 601 exist within a prescribed distance from Ps, the control unit 300 may determine for example the node 601 that is away from Ps by the shortest distance in S704. As described above, in a case where for example sudden braking occurred in a vehicle etc., when an image recorded by a drive recorder etc. is checked by a human in a visual manner and the cause of the occurrence of the sudden braking is estimated, the cause is often found in a curve, an intersection, etc. Thus, a node determined in S704 has a high possibility of having the cause of the sudden braking, and can be treated as the cause of the sudden braking.

Figure 9A:
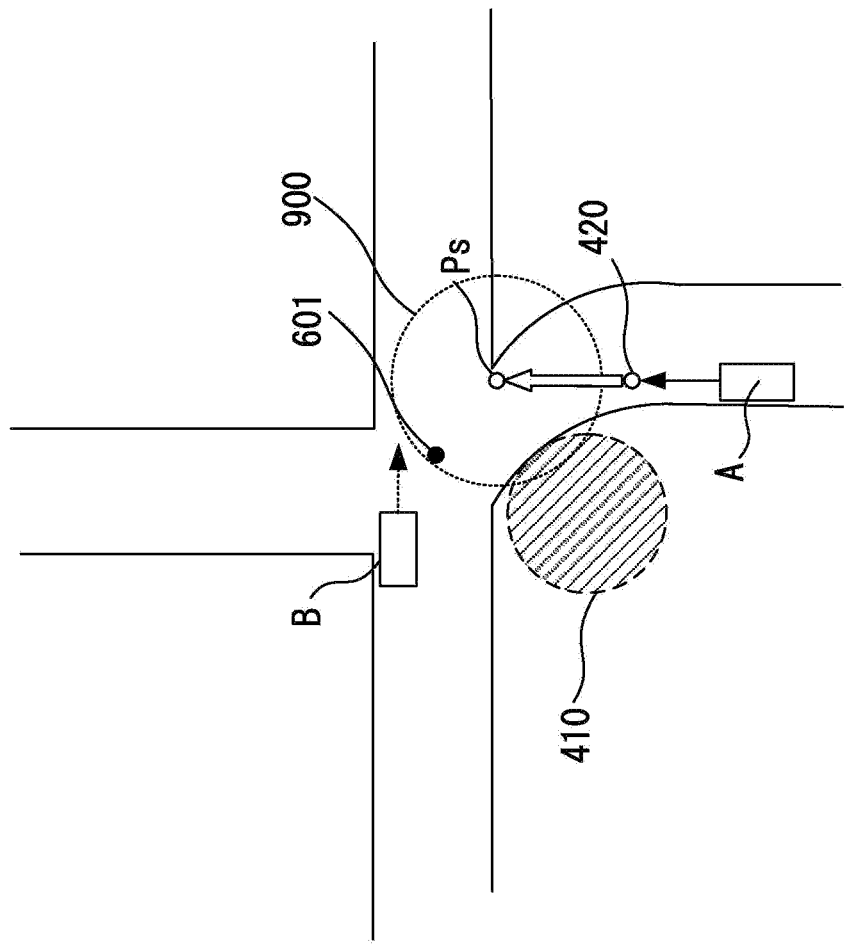
FIG. 9A and FIG. 9B exemplify determination of a node according to the first embodiment.
Figure 9B:
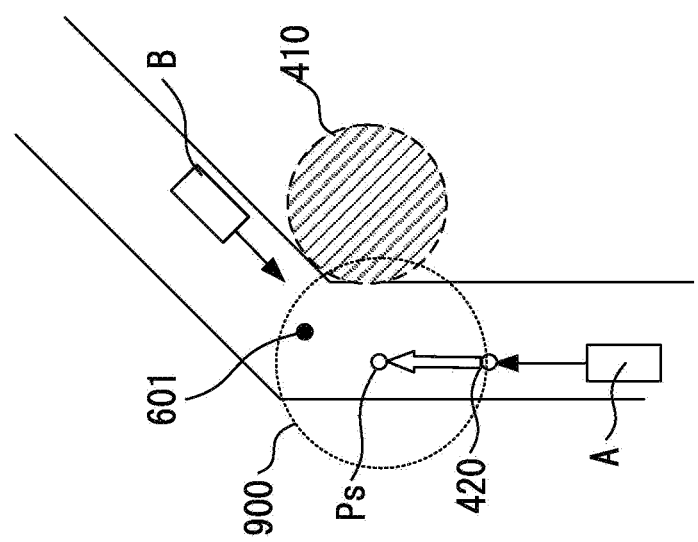

FIG. 9A and FIG. 9B exemplify the determination of a node in S704. FIG. 9A and FIG. 9B correspond to FIG. 4A and FIG. 4B, respectively, and the spot 420 is a spot at which the brake was suddenly stepped on in vehicle A. Also, Ps is the position of a spot that is ahead, in the traveling direction of the vehicle, of the occurrence spot of a sudden braking incident determined in S703. The node 601 is a node registered in the numerical map node information 600. A scope 900 is a scope that is within a prescribed distance from Ps, within which a search is made for determining a node in S704. Also, for example the control unit 300 may determine the node 601 that is included in the scope 900 in the process in S704.

In S705, the control unit 300 outputs for example sudden-braking cause spot information 1001. Also, the control unit 300 may register for example output sudden-braking cause spot information 1001 in the dangerous spot information 1000 that is registered in the storage unit 310.

FIG. 10 exemplifies the dangerous spot information 1000, and sudden-braking cause spot information 1001 has been registered in the dangerous spot information 1000. The sudden-braking cause spot information 1001 may include for example information about a position that is estimated to be the cause spot of a sudden braking incident whose occurrence was detected in the braking event information 800. In the example illustrated in FIG. 10, the sudden-braking cause spot information 1001 includes for example a braking event identifier 1002, a position ahead 1003 and a node identifier 1004, and these pieces of information are associated in the sudden-braking cause spot information 1001. The braking event identifier 1002 may be an identifier that is assigned to the braking event information 800 in S701. Also, the position ahead 1003 may be the position (Ps) of a spot that is ahead, in the traveling direction of a vehicle, of the occurrence spot of the sudden braking incident determined in S703. The node identifier 1004 may be the node identifier of a node that is estimated to be the cause spot of the sudden braking incident determined in S704.

Note that while FIG. 10 exemplifies a case where the dangerous spot information 1000 includes the position ahead 1003 and the node identifier 1004, one of the position ahead 1003 and the node identifier 1004 does not have to be included in the dangerous spot information 1000 in a different embodiment. When the process in S705 is completed, the present flow is terminated. Note that in the processes from S703 through S705, the control unit 300 functions as for example the output unit 301.

As described above, in the first embodiment, the control unit 300 of the server 102 receives, from the on-board device 101 of a vehicle, information including the position and the motion of the vehicle at the occurrence time of a sudden braking incident. Then, on the basis of the received information, the control unit 300 of the server 102 outputs information about the position of a spot that is ahead, in the traveling direction of the vehicle, of the occurrence spot of the sudden braking incident. As described above, in a case when for example the driver steps on the brake in a vehicle, a spot having the cause of that sudden stepping on the brake is often positioned ahead, in the traveling direction of the vehicle, of the spot at which the driver stepped on the brake in the vehicle. Accordingly, according to the first embodiment, the control unit 300 of the server 102 can output information about a spot estimated to have the cause of the occurrence of the sudden braking incident. Also, for example manufacturing companies of car navigation systems etc. can use output information about a spot estimated to have the cause of the occurrence of the sudden braking incident, to warn drivers of vehicles. Also, operators of road projects etc. for example can know spots that have a high possibility of having a factor that reduces safety, from output information about a spot estimated to have a cause of the occurrence of a sudden braking incident, and can use the information to help them take measures to remove such factors. Accordingly, according to the first embodiment, it is possible to contribute to for example further prevention of accidents.

Also, as described above, the position of a spot that is ahead, in the traveling direction of a vehicle, of the occurrence spot of a sudden braking incident has a high possibility of indicating the spot having the cause of sudden braking more accurately than does for example the spot at which the driver stepped on the brake in a vehicle. Accordingly, by for example using the position of this spot ahead, it is made possible to warn the driver of a vehicle that is entering a spot having the cause of a sudden braking incident from a different road as described by referring to FIG. 4A and FIG. 4B.

Also, in the first embodiment, the control unit 300 of the server 102 determines, from the numerical map node information 600, a node with a prescribed distance from the position of a spot that is ahead, in the traveling direction of the vehicle, of the occurrence spot of a sudden braking incident, and outputs the node. As described above, in a case where for example a sudden braking incident occurred in a vehicle etc., when an image recorded by a drive recorder etc. is checked by a human in a visual manner and the cause of the sudden braking is estimated, the cause is often found in a curve, an intersection, etc. Thus, anode in the vicinity of a position that is ahead in the traveling direction of a vehicle at the occurrence time of sudden braking has a high possibility of having the cause of the driver stepping on the brake, and it is useful to provide information of a node having a high possibility that the cause of such a sudden braking incident will be found in it. Also, meanwhile, numerical maps in which for example information about the positions of roads and intersections across the nation and various types of spot information are registered are widely used for car navigation systems etc. Thus, determining a node as described above makes it possible to easily register, in a numerical map, for example information about dangerous spots estimated to be the causes of the occurrence of sudden braking incidents, and it is possible to provide information in a form in which the user can use the information easily.

<Second Embodiment>

In the second embodiment, by using the dangerous spot information 1000, a process of obtaining further information that is useful will be exemplified. Note that in the second embodiment as well, the sudden-braking cause spot information 1001 may be registered in the dangerous spot information 1000 by for example a process similar to that described in the first embodiment.

FIG. 11 exemplifies the numerical map link information 1100 according to the second embodiment. The numerical map link information 1100 may be for example a numerical map created by an institution such as the Geographical Survey Institute etc. As described above, a numerical map indicates for example roads by using nodes and links. In the numerical map link information 1100 illustrated in FIG. 11, for example a link 1101, which is information representing a link on a numerical map, is registered. The link 1101 may include a link identifier 1102 and link information 1103, and these pieces of information are associated in the link 1101. The link identifier 1102 is an identifier for identifying each link that is registered in the numerical map link information 1100. In the link information 1103, for example the node identifier 602 of two nodes that are connected by a link identified by the link identifier 1102 is registered, and a link represents a road. For example, a line segment connecting two nodes that are identified by the node identifier 602 included in the link information 1103 may be a road that is identified by the link identifier 1102.

Figure 12:
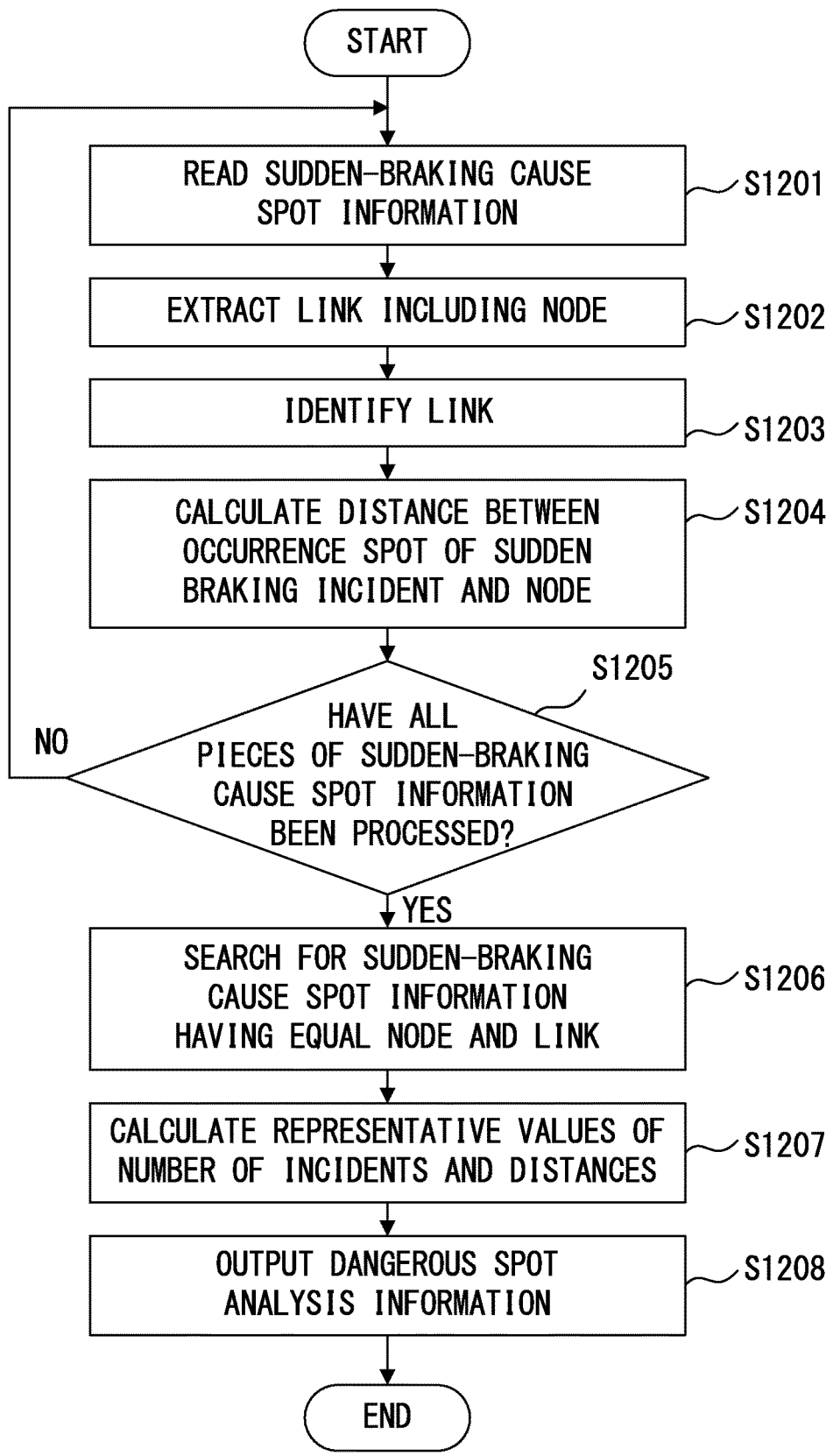
FIG. 12 exemplifies an analysis process for dangerous spot information according to the second embodiment.

FIG. 12 exemplifies an analysis process for the dangerous spot information 1000 according to the second embodiment. For example, in the server 102, when an execution instruction of an analysis process for the dangerous spot information 1000 is input, the control unit 300 of the server 102 may start an analysis process of the dangerous spot information 1000 illustrated in FIG. 12.

In S1201, the control unit 300 of the server 102 reads one piece of the sudden-braking cause spot information 1001 from the dangerous spot information 1000. In S1202, the control unit 300 extracts for example the link 1101 including the node identifier 1004 of the read sudden-braking cause spot information 1001 in the link information 1103, from the numerical map link information 1100. Note that, in the process in S1202, in a case when for example a node identified by the node identifier 1004 is arranged at a point at which a plurality of links such as an intersection, a corner, etc., cross, a plurality of links 1101 are extracted.

Next, the control unit 300 in S1203 refers to the braking event information 800 that is identified by the braking event identifier 1002 of the sudden-braking cause spot information 1001 that was read in S1201. Then, on the basis of a record related to the travel of the vehicle included in the braking event information 800, the control unit 300 determines which of the links the vehicle was traveling in at the occurrence time of the sudden braking incident from among the links 1101 extracted in S1202. Note that the control unit 300 may use for example the following manner in order to determine a link in which the vehicle was traveling. For example, because coordinates measured by a GPS receiver involve an error, a technique for arranging measured coordinates on a spot on a road is known. An example of this method is map matching, and in one embodiment, the control unit 300 may use for example map matching so as to arrange the traveling spot coordinates 505 included in the braking event information 800 on a road and may determine a link in which a vehicle was traveling.

In S1204, the control unit 300 calculates a distance between the spot at which the sudden braking incident occurred in the braking event information 800 and the node identified by the node identifier 1004, the braking event information 800 being identified by the braking event identifier 1002 of the sudden-braking cause spot information 1001. Note that as a spot at which a sudden braking incident occurred in the braking event information 800, for example the traveling spot coordinates 505 of the measurement information 501 that is determined on the basis of the forward-backward acceleration 503 in the process in S702 above may be used. Also, the position of a node identified by the node identifier 1004 may be obtained from for example the position information 603 of the numerical map node information 600.

In S1205, the control unit 300 determines whether or not all the pieces of sudden-braking cause spot information 1001 included in the dangerous spot information 1000 have been read in S1201. When there is a piece of the sudden-braking cause spot information 1001 that has not been read (NO in step S1205), the flow returns to S1201. Meanwhile, when all the pieces of sudden-braking cause spot information 1001 have been read (YES in S1205), the flow proceeds to S1206.

In S1206, the control unit 300 searches for a set of pieces of the sudden-braking cause spot information 1001 having equal pairs of the node identifier 1004 of the sudden-braking cause spot information 1001 read in S1201 and the link 1101 determined in S1203 for that node identifier 1004.

In S1207, the control unit 300 counts, as the number of the incidents, the number of pieces of the sudden-braking cause spot information 1001 included in each set that is found in the search. Note that when a plurality of sets was found in the search in S1206, the control unit 300 may count the number of the incidents for each of the sets. Also, the control unit 300 uses a plurality of distances calculated in S1204 for the sudden-braking cause spot information 1001 included in the determined set in order to calculate the representative value of the plurality of distances. In this example, the representative value may be for example an average value, a median value, a mode value, etc.

Next, in S1208, the control unit 300 generates the dangerous spot analysis information 1300. In the dangerous spot analysis information 1300, for example information of a link determined in S1203 may be registered in association with information included in the sudden-braking cause spot information 1001 read in S1201. Also, in association with a piece of information included in the sudden-braking cause spot information 1001 read in S1201, information of representative values of the number of incidents and distances calculated in S1207 for a set in which that piece of the sudden-braking cause spot information 1001 is included may be registered in the dangerous spot analysis information 1300. The control unit 300 outputs for example the generated dangerous spot analysis information 1300 to the storage unit 310 so as to make the storage unit 310 store the information, and the present operation flow is terminated.

FIG. 13 exemplifies the dangerous spot analysis information 1300. In the dangerous spot analysis information 1300, sudden-braking cause spot information 1301 is registered. The sudden-braking cause spot information 1301 includes a braking event identifier 1302, a position ahead 1303 and a node identifier 1304. These pieces of the braking event identifier 1302, the position ahead 1303 and the node identifier 1304 may be pieces of information that correspond respectively to the braking event identifier 1002, the position ahead 1003 and the node identifier 1004 of the dangerous spot information 1000.

Also, the sudden-braking cause spot information 1301 further includes a link identifier 1305 in addition to these pieces of information. The link identifier 1305 is information representing a link in which the vehicle was traveling at the occurrence time of a sudden braking incident in the braking event information 800 that is identified by the braking event identifier 1302. Also, it is assumed for example that pieces of the sudden-braking cause spot information 1301 having matching node identifiers 1304 and having different link identifiers 1305 are registered in the dangerous spot analysis information 1300. In such a case, it can be estimated that there is a high possibility that a cause of a sudden stepping on the brake exists in the node that is identified by that node identifier 1304, from the viewpoint of a plurality of links identified by the link identifier 1305. As an example, a situation may be assumed where these plurality of links have hindered visibility for each other.

Also, the sudden-braking cause spot information 1301 includes a number of incidents 1306. The number of incidents 1306 represents for example the number of times that a sudden braking incident occurred in a vehicle entering the node that is identified by the node identifier 1304 from the link that is identified by the link identifier 1305. Accordingly, the number of incidents 1306 can be used as for example an index that represents the likelihood that the node identified by the position ahead 1303 and the node identifier 1304 is a dangerous spot. For example, when the number of incidents 1306 of the sudden-braking cause spot information 1301 is great, the user of information included in the dangerous spot analysis information 1300 can consider a node identified by the node identifier 1304 of that piece of the sudden-braking cause spot information 1301 to be a particularly dangerous node.

Further, the sudden-braking cause spot information 1301 includes a distance representative value 1307. It is assumed for example that a plurality of pieces of the sudden-braking cause spot information 1301 having equal pairs of the node identifiers 1304 and the link identifiers 1305 are registered in the dangerous spot analysis information 1300. In such a case, it is represented that a plurality of sudden braking incidents occurred when vehicles are entering the node identified by the node identifier 1304 from the link identified by that piece of the link identifier 1305. Also, in the distance representative value 1307, for example a representative value that represents a plurality of distances from the occurrence spots of the plurality of such sudden braking incidents to the node identified by the node identifier 1304 is registered. Note that the representative value may be for example an average value, a median value, a mode value, etc. of a plurality of distances. Accordingly, the distance representative value 1307 can be considered to more accurately reflect the distance over which the driver of a vehicle was able to sense the danger. Accordingly, the distance representative value 1307 is information useful in determining an appropriate timing for warning drivers in car navigation systems and for operators of road projects in searching for causes of a sudden stepping on the brake. Alternatively, the distance representative value 1307 obtained in a different embodiment may be used for for example determining the position of a spot ahead in S703 and may be used for improving the accuracy of determining the position.

As described above, in the second embodiment, the control unit 300 outputs information of the link identifier 1305, the number of incidents 1306 and the distance representative value 1307 in addition to the braking event identifier 1302, the position ahead 1303 and the node identifier 1304. Accordingly, in the second embodiment, it is possible to provide further information that is useful and that is related to a cause spot of a sudden stepping on the brake in addition to the effects achieved by the first embodiment. Also, for example manufacturing companies of car navigation systems etc. can use information of the above link identifier 1305, the number of incidents 1306 and the distance representative value 1307 so as to try to improve the functions of their products. Alternatively, these pieces of information may be used for example by operators of road projects to search for causes of accidents and to build safer roads. Accordingly, by using these pieces of information, it is possible for for example manufacturing companies of car navigation systems, operators of road projects, etc. to contribute to the suppression of further accidents. Note that in a different embodiment, some of the information included in the sudden-braking cause spot information 1301 does not have to be included.

Also, in the above explanations, descriptions are given for an example of obtaining the occurrence spot of a sudden braking incident from the traveling spot coordinates 505 of the measurement information 501 in the process in S1204. However, the embodiments are not limited to this. For example, the process in S1204 may be executed by using a method of map matching for arranging measured coordinates on spots on roads so as to arrange the traveling spot coordinates 505 on a link, and using the coordinates of the link on which the traveling spot coordinates 505 are arranged as the coordinates of the occurrence spot of a sudden braking incident.

While the embodiments have been exemplified, the embodiments are not limited to the above embodiments. For example, in the above embodiments, descriptions are given for an example in which it is determined that a sudden braking incident has occurred in a case when the magnitude of the forward-backward acceleration having a negative value measured by an acceleration sensor becomes equal to or higher than a prescribed value. However, the embodiments are not limited to this, and the occurrence of a sudden braking incident may be detected by using a different method.

Also, the operation flows of FIG. 7 and FIG. 12 for example are exemplary, and the embodiments are not limited to them. For example, when it is possible, the operation flows of FIG. 7 and FIG. 12 may have the process order changed, may further include an additional process or may have some of the processes omitted.

Figure 14:
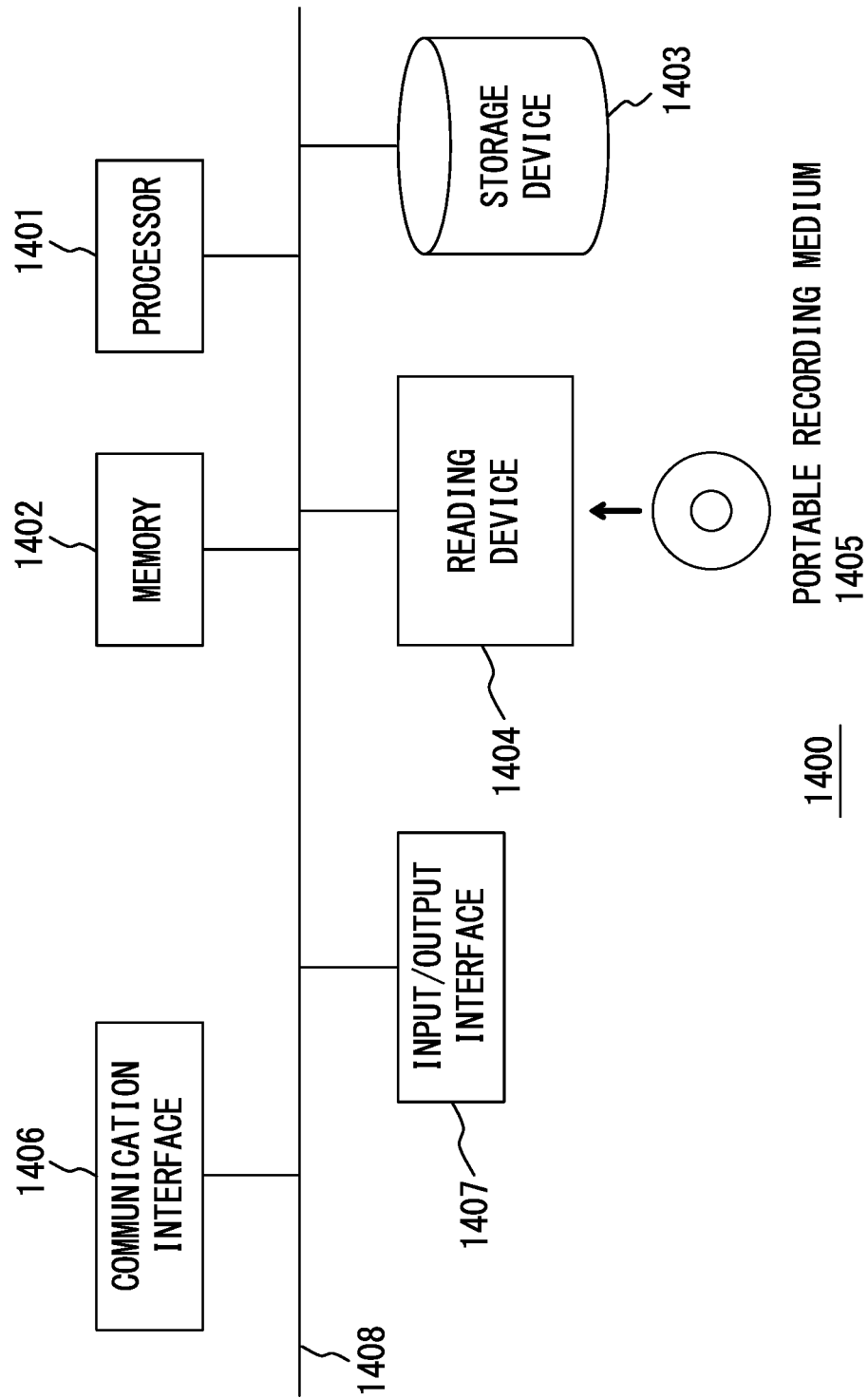
FIG. 14 exemplifies a hardware configuration of a computer for implementing a server according to the embodiments.

FIG. 14 exemplifies a hardware configuration of a computer 1400 (information processing apparatus) for implementing the server 102 according to the embodiments. The hardware configuration of FIG. 14 for implementing the server 102 includes for example a processor 1401, a memory 1402, a storage device 1403, a reading device 1404, a communication interface 1406 and an input/output interface 1407. Note that the processor 1401, the memory 1402, the storage device 1403, the reading device 1404, the communication interface 1406 and the input/output interface 1407 may be connected to each other via for example a bus 1408.

The processor 1401 may use the memory 1402 to execute a program describing for example procedures of the above operation flows in order to execute the processes in the above flows. For example, the control unit 300 of the server 102 is the processor 1401, and the storage unit 310 may include for example the memory 1402, the storage device 1403 and a portable recording medium 1405. The processor 1401 of the server 102 may function as the output unit 301 by for example reading a program stored in the storage device 1403 so as to execute it. The storage device 1403 of the server 102 may store for example the numerical map node information 600, the braking event information 800, the dangerous spot information 1000, the numerical map link information 1100 and the dangerous spot analysis information 1300.

The memory 1402 is for example a semiconductor memory, and may include a RAM region and a ROM region. Note that RAM is an abbreviation for Random Access Memory. ROM is an abbreviation for Read Only Memory. A ROM region may be for example a semiconductor memory such as a flash memory etc. The storage device 1403 is for example a hard disk, a semiconductor memory such as a flash memory etc., or an external storage device.

The reading device 1404 accesses the portable recording medium 1405 in accordance with an instruction from the processor 1401. The portable recording medium 1405 is implemented by for example a semiconductor device (such as a USB memory etc.), a medium to and from which information is input and read through magnetic effects (such as a magnetic disk etc.), a medium to and from which information is input and output through optical effects (such as a CD-ROM, a DVD, etc.), or other devices. Note that USB is an abbreviation for Universal Serial Bus. CD is an abbreviation for Compact Disk. DVD is an abbreviation for Digital Versatile Disk. The communication interface 1406 transmits and receives data via a network in accordance with an instruction from the processor 1401. The communication unit 320 may be for example the communication interface 1406. The input/output interface 1407 may be for example an interface between the input device and the output device. The input device may be for example a device such as a keyboard, a mouse, etc., which receive an instruction from the user. The output device may be for example a display device such as a display, a touch panel, etc., or a printing device such as a printer.

Figure 15:
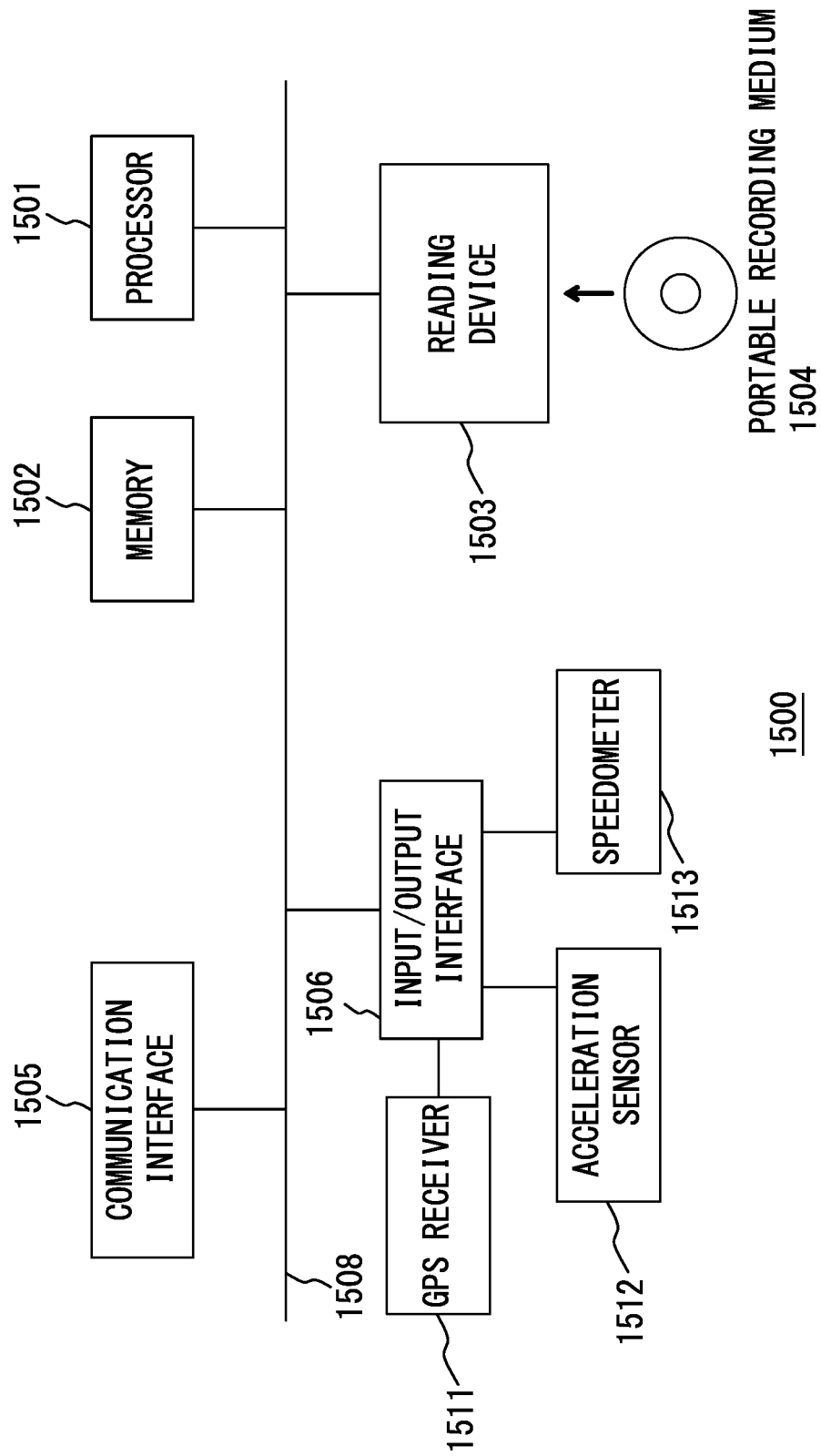
FIG. 15 exemplifies a hardware configuration of a computer for implementing an on-board device according to the embodiments.

FIG. 15 exemplifies a hardware configuration of a computer 1500 for implementing the on-board device 101 according to the embodiments. The hardware configuration of FIG. 15 for implementing the on-board device 101 includes for example a processor 1501, a memory 1502, a reading device 1503, a communication interface 1505 and an input/output interface 1506. Note that the processor 1501, the memory 1502, the reading device 1503, the communication interface 1505 and the input/output interface 1506 may be connected to each other via for example a bus 1508. Also, for example a sensor such as a GPS receiver 1511, an acceleration sensor 1512, a speedometer 1513, etc. may be connected to the input/output interface 1506.

The processor 1501 may use for example the memory 1502 to execute a program so as to perform a process of generating the above braking event report information 500 and transmitting it to the server 102. For example, the control unit 200 of the on-board device 101 is the processor 1501, and the storage unit 210 may include for example the memory 1502 and the portable recording medium 1504. In the memory 1502 of the on-board device 101, for example values measured by a sensor such as the GPS receiver 1511, the acceleration sensor 1512, the speedometer 1513, etc. may be stored. The memory 1502 is for example a semiconductor memory, and may include a RAM region and a ROM region. A ROM region may be for example a semiconductor memory such as a flash memory etc.

The reading device 1503 accesses the portable recording medium 1504 in accordance with an instruction from the processor 1501. The portable recording medium 1504 may be for example a semiconductor memory such as a flash memory etc. including an SD memory card. The communication interface 1505 transmits and receives data via a network in accordance with an instruction from the processor 1501. The communication unit 220 may be for example the communication interface 1505. The input/output interface 1506 may be for example an interface between the input device and the output device. Also, for example a sensor such as the GPS receiver 1511, the acceleration sensor 1512, the speedometer 1513, etc. may be connected to the input/output interface 1506. The GPS receiver 1511 may report, to the processor 1501, for example information representing the position of the vehicle in which the GPS receiver 1511 is mounted, in accordance with an instruction from the processor 1501. Also, in one embodiment, the GPS receiver 1511 may report, to the processor 1501, information representing the velocity vector of the vehicle on which the GPS receiver 1511 is mounted. The acceleration sensor 1512 may report, to the processor 1501, for example information representing the forward-backward acceleration of the vehicle on which the acceleration sensor 1512 is mounted, in accordance with an instruction from the processor 1501. The speedometer 1513 may report, to the processor 1501, for example information representing the speed of the vehicle on which the speedometer 1513 is mounted, in accordance with an instruction from the processor 1501. Also, the speedometer 1513 does not have to be included in the on-board device 101 in one embodiment. The output device may be for example a display device such as a display, a touch panel, etc.

Also, the respective programs according to the embodiments may be provided to the on-board device 101 and the server 102 in a form for example in which:

(1) They are installed in the storage device 1403 or the memory 1502 in advance;

(2) They are provided through the portable recording medium 1405 or portable recording medium 1504; and (3) They are provided from a program server through a network.

Note that the hardware configurations of the computers 1400 and 1500 described by referring to FIG. 14 and FIG. 15 are exemplary, and the embodiments are not limited to this. For example, some or all of the functions of the control unit 200 of the on-board device 101 and the control unit 300 of the server 102 described above may be implemented as hardware by using an FPGA, SoC, etc. in a different embodiment. Note that FPGA is an abbreviation for Field Programmable Gate Array. SoC is an abbreviation for System-on-a-chip.

According to the above embodiments, it is possible to provide information about a spot that is estimated to have the cause of the occurrence of a sudden braking incident.

Also, it is to be understood by those skilled in the art that some embodiments including the above embodiments include various types of variations and alternatives for the embodiments described above. The various types of embodiments can be embodied by modifying constituents. Also, various embodiments may be implemented by combining a plurality of constituents described in the embodiments described above. Further, various embodiments may be implemented by deleting or replacing some of all of the constituents described in the embodiments or by adding some constituents to constituents described in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method executed by a computer, the method comprising:

determining, by a processor and from among a plurality of nodes included in a numerical map, a node that is within a prescribed distance from a position of a spot that is ahead, in a traveling direction of at least one vehicle at occurrence times of a plurality of incidents, of occurrence spots of the plurality of incidents, for each of the plurality of incidents, the plurality of incidents being an incident of a sudden stepping on a brake, respectively, and determined based on acceleration and a position measured by a sensor provided to the at least one vehicle;

determining, by the processor, a link in which the at least one vehicle was traveling at the occurrence times of the plurality of incidents from among a plurality of links included in the numerical map; and associating, by the processor, a node and a link that were determined for each of the plurality of incidents so as to output the node the link.

2. The method according to claim 1, wherein the determining of the node further includes, by the processor, identifying the node by using a traveling speed of the at least one vehicle.

3. The method according to claim 1, the method further comprising outputting, by the processor, a number of pairs between which nodes match each other and links match each other from among a plurality of pairs of nodes and links output for each of the plurality of incidents, in the associating and the output of the node and the link.

4. The method according to claim 3, the method further comprising:

calculating, by the processor, a distance between an occurrence spot of an incident and a node that is within the prescribed distance from a position of a spot that is ahead, in a traveling direction of the at least one vehicle at an occurrence time of the incident, of an occurrence spot of the incident, for each of the plurality of incidents, respectively, and outputting, by the processor, a representative value that represents the plurality of distances calculated for nodes of pairs between which the nodes match each other and the links match each other.

5. A non-transitory computer-readable recording medium having stored therein a program for causing a computer to execute a process, the process comprising:

determining from among a plurality of nodes included in a numerical map, a node that is within a prescribed distance from a position of a spot that is ahead, in a traveling direction of at least one vehicle at occurrence times of a plurality of incidents, of occurrence spots of the plurality of incidents, for each of the plurality of incidents, the plurality of incidents being an incident of a sudden stepping on a brake, respectively, and determined based on acceleration and a position measured by a sensor provided to the at least one vehicle;

determining, by the processor, a link in which the at least one vehicle was traveling at the occurrence times of the plurality of incidents from among a plurality of links included in the numerical map; and associating, by the processor, a node and a link that were determined for each of the plurality of incidents so as to output the node the link.

6. An information processing apparatus comprising:

a processor that determining from among a plurality of nodes included in a numerical map, a node that is within a prescribed distance from a position of a spot that is ahead, in a traveling direction of at least one vehicle at occurrence times of a plurality of incidents, of occurrence spots of the plurality of incidents, for each of the plurality of incidents, the plurality of incidents being an incident of a sudden stepping on a brake, respectively, and determined based on acceleration and a position measured by a sensor provided to the at least one vehicle;

determining, by the processor, a link in which the at least one vehicle was traveling at the occurrence times of the plurality of incidents from among a plurality of links included in the numerical map; and associating, by the processor, a node and a link that were determined for each of the plurality of incidents so as to output the node the link.

* * * * *